(12) United States Patent
Ma et al.

(10) Patent No.: US 8,521,418 B2
(45) Date of Patent: Aug. 27, 2013

(54) GENERIC SURFACE FEATURE EXTRACTION FROM A SET OF RANGE DATA

(75) Inventors: Yunqian Ma, Plymouth, MN (US); Jindrich Dunik, Plzen (CZ); Jan Lukas, Melnik (CZ)

(73) Assignee: Honeywell International Inc., Morristown, NJ (US)

( * ) Notice: Subject to any disclaimer, the term of this patent is extended or adjusted under 35 U.S.C. 154(b) by 218 days.

(21) Appl. No.: 13/245,363

(22) Filed: Sep. 26, 2011

(65) Prior Publication Data
US 2013/0080045 A1  Mar. 28, 2013

(51) Int. Cl.
*G01C 21/00* (2006.01)

(52) U.S. Cl.
USPC ............ 701/408; 701/426; 701/436; 340/435

(58) Field of Classification Search
USPC .................. 701/408, 426, 436, 442, 467, 514; 340/903, 435, 436
See application file for complete search history.

(56) References Cited

U.S. PATENT DOCUMENTS

| | | | |
|---|---|---|---|
| 4,891,630 A | | 1/1990 | Friedman et al. |
| 5,383,013 A | | 1/1995 | Cox |
| 5,719,774 A | * | 2/1998 | Rao et al. ............... 703/2 |
| 5,751,406 A | * | 5/1998 | Nakazawa et al. ........ 356/3.03 |
| 5,870,490 A | | 2/1999 | Takahashi et al. |
| 5,978,504 A | | 11/1999 | Leger |
| 5,988,862 A | | 11/1999 | Kacyra et al. |
| 6,019,496 A | * | 2/2000 | Rao et al. ............... 711/131 |
| 6,307,959 B1 | | 10/2001 | Mandelbaum |
| 6,476,803 B1 | | 11/2002 | Zhang et al. |
| 6,693,962 B1 | | 2/2004 | Murching et al. |
| 6,704,621 B1 | | 3/2004 | Stein et al. |
| 6,724,383 B1 | | 4/2004 | Herken et al. |
| 6,771,840 B1 | | 8/2004 | Loannou et al. |
| 6,911,995 B2 | | 6/2005 | Ivanov et al. |
| 7,065,461 B2 | | 6/2006 | Chang et al. |
| 7,203,342 B2 | | 4/2007 | Pedersen |
| 7,215,810 B2 | | 5/2007 | Kaufmann et al. |
| 7,239,751 B1 | | 7/2007 | Amador |
| 7,436,988 B2 | | 10/2008 | Zhang et al. |

(Continued)

FOREIGN PATENT DOCUMENTS

| | | |
|---|---|---|
| EP | 1780678 | 5/2007 |
| EP | 2026279 | 2/2009 |

(Continued)

OTHER PUBLICATIONS

Kotaba, "System and Method of Extracting Plane Features", Sep. 19, 2008, Published in: US.

(Continued)

*Primary Examiner* — Gertrude Arthur Jeanglaude
(74) *Attorney, Agent, or Firm* — Fogg & Powers LLC

(57) ABSTRACT

An example embodiment includes a method including receiving a three-dimensional set of range data including a plurality of points from one or more range finders. The method also includes extracting one or more surface features. Extracting includes segmenting the set of range data into a plurality of surfaces based on one or more edges, selecting one or more of the plurality of surfaces as the one or more surface features, and describing the one or more surface features based on a generic descriptor that can describe both planar and non-planar surface features.

20 Claims, 10 Drawing Sheets

(56) References Cited

U.S. PATENT DOCUMENTS

| | | | |
|---|---|---|---|
| 7,574,020 | B2 | 8/2009 | Shamaie |
| 7,605,817 | B2 | 10/2009 | Zhang et al. |
| 7,639,896 | B2 | 12/2009 | Sun et al. |
| 7,643,966 | B2 | 1/2010 | Adachi et al. |
| 7,956,862 | B2 | 6/2011 | Zhang et al. |
| 2003/0067461 | A1 | 4/2003 | Fletcher et al. |
| 2004/0183905 | A1 | 9/2004 | Comaniciu et al. |
| 2004/0234136 | A1 | 11/2004 | Zhu et al. |
| 2005/0069173 | A1 | 3/2005 | Morisada et al. |
| 2005/0114059 | A1 | 5/2005 | Chang et al. |
| 2005/0271280 | A1 | 12/2005 | Farmer et al. |
| 2006/0188849 | A1 | 8/2006 | Shamaie |
| 2006/0221072 | A1 | 10/2006 | Se et al. |
| 2006/0256114 | A1 | 11/2006 | Nielsen et al. |
| 2007/0217682 | A1 | 9/2007 | Motomura et al. |
| 2007/0234230 | A1 | 10/2007 | Pedersen |
| 2007/0285217 | A1 | 12/2007 | Ishikawa et al. |
| 2008/0013836 | A1 | 1/2008 | Nakamura et al. |
| 2008/0096152 | A1 | 4/2008 | Cheang |
| 2008/0123959 | A1 | 5/2008 | Ratner et al. |
| 2008/0167814 | A1 | 7/2008 | Samarasekera et al. |
| 2009/0310867 | A1 | 12/2009 | Matei et al. |
| 2010/0053191 | A1 | 3/2010 | Chang et al. |
| 2010/0074473 | A1 | 3/2010 | Kotaba |
| 2010/0104199 | A1 | 4/2010 | Zhang et al. |
| 2010/0111370 | A1 | 5/2010 | Black et al. |
| 2010/0284572 | A1 | 11/2010 | Lukas et al. |
| 2011/0102545 | A1 | 5/2011 | Krishnaswamy et al. |
| 2011/0153206 | A1 | 6/2011 | Kotaba et al. |
| 2011/0249883 | A1 | 10/2011 | Can et al. |
| 2011/0274343 | A1 | 11/2011 | Krishnaswamy et al. |
| 2012/0213440 | A1 | 8/2012 | Tappen et al. |

FOREIGN PATENT DOCUMENTS

| | | |
|---|---|---|
| EP | 2166375 | 3/2010 |
| EP | 2249311 | 11/2010 |
| GB | 2405776 | 3/2005 |
| JP | 11325833 | 11/1999 |
| WO | 0108098 | 2/2001 |
| WO | 2007056768 | 5/2007 |

OTHER PUBLICATIONS

Krishnaswamy, "System and Method for Extraction of Features From a 3-D Point Cloud", "U.S. Appl. No. 12/775,865, filed May 7, 2010", , Published in: US.

Wu et al. , "3D Model Matching With Viewpoint-Invariant Patches (VIP)", "2008 IEEE Conference on Computer Vision and Patten Recognition", Jun. 23-28, 2008, pp. 1-8.

Arras et al., "Feature Extraction and Scene Interpretation for Map-Based Navigation and Map Building", "Mobile Robotics XII", 1997, pp. 1-12, vol. 3210, Publisher: SPIE.

Barnat, J. et al., "Distributed LTL Model-Checking in SPIN", "International Workshop on Spin Model Checking", Jan. 1, 2001, pp. 200-216, Publisher: Springer-Verlag New York, Inc.

Bosnacki, D. et al., "Symmetric Spin", "Lecture Notes in Computer Science", 2000, pp. 1-19, No. 1885, Publisher: Springer-Verlag.

Bay et al., "SURF: Speeded Up Robust Features", "Proceedings of 9th European Conference on Computer Vision", May 7-13, 2006, pp. 1-14, Published in: Graz, Austria.

Bosnacki et al., "A Heuristic for Symmetry Reductions with Scalarsets", "Proc. Int. Symp. Formal Methods for Increasing Sofware Productivity", Mar. 12, 2001, pp. 518-533, Publisher: Lecture Notes in Computer Science.

Brim, L. et al., "Distributed LTL Model Checking Based on Negative Cycle Detection", "Lecture Notes in Computer Science", Sep. 1, 2001, pp. 96-107, vol. 2245, Publisher: Springer-Verlag.

Canny, "A Computational Approach to Edge Detection", "Transactions on Pattern Analysis and Machine Intelligence", Nov. 1986, pp. 679-698, vol. 8, No. 6, Publisher: IEEE.

"DARPA Grand Challenge '05", "available at http://www.darpa.mil/grandchallenge05/ accessed Jun. 9, 2010", Dec. 31, 2007, p. 1 Publisher: DARPA.

, "Navigation—The Future—Galileo", "available at http://www.esa.int/esaNA/galileo.html accessed Jun. 9, 2010", 2000, pp. 1-2, Publisher: European Space Agency (ESA).

"GLONASS Status", "Information—Analytical Centre available at http://www.glonass-ianc.rsa.ru/pls/htmldb/f?p=202:20:2275518349255099::NO accessed Jun. 9, 2010", 2006, p. 1 Publisher: Russian Space Agency, Information-analytical centre.

"Global Navigation Satellite System", "available at http://www.spirent.com/Positioning-and-Navigation/GNSS.aspx", 2010, pp. 1-2, Publisher: Spirent Communications plc, accessed Jun. 9, 2010.

Goshtasby et al. , "Point Pattern Matching Using Convex Hull Edges", "IEEE Transctions on Systems, Man, and Cybernetics ", Sep./Oct. 1985, pp. 631-637, vol. 15, No. 5.

"Global Positioning System: Serving the World", "http://www.gps.gov/ accessed Jun. 9, 2010", , pp. 1-2, Publisher: USA.gov.

Haralick, "Propagating Covariance in Computer Vision", "Performance Characterization in Computer Vision", Aug. 31, 2000, pp. 1-15, vol. 17, Publisher: Springer Series on Computational Imaging and Vision.

Harris et al., "A Combined Corner and Edge Detector", Aug. 1988, pp. 147-151, Publisher: The Plessey Company, Published in: United Kingdom.

R. Hartley, "In Defense of the Eight-Point Algorithm", "IEEE Transactions on Pattern Analysis and Machine Intelligence", Jun. 1997, pp. 580-593, vol. 19, No. 6, Publisher: IEEE.

Hendriks, M. et al., "Adding Symmetry Reduction to UPPAAL", "Lecture Notes in Computer Science", May 13, 2004, pp. 46-59, vol. 2791, Publisher: Springer Berlin.

Hoppe et al. , "Surface Reconstruction From Unorganized Points", 1992, pp. 71-78, Publisher: University of Washington.

Horn et al., "Closed-Form Solution of Absolute Orientation Using Unit Quaternions", "Journal of the Optical Society of America", Apr. 1987, pp. 629-642, vol. 4, Publisher: Optical Society of America.

Iosif, Radu, "Symmetry Reduction Criteria for Software Model Checking", "Lecture Notes in Computer Science", Jan. 1, 2002, pp. 22-41, vol. 2318, Publisher: Springer-Verlag.

Irschara et al. , "From Structure-From-Motion Point Clouds to Fast Location Recognition", "IEEE Computer Society Conference on Computer Vision and Pattern Recognition", Apr. 18, 2009, pp. 1-8.

"Indian Space Research Organisation", "available at http://www.isro.org/ accessed Jun. 9, 2010", 2008, p. 1 Publisher: ISRO.

Jean et al. , "Trajectories Normalization for Viewpoint Invariant Gait Recognition", Dec. 8, 2008, pp. 1-4, Publisher: IEEE.

Krishnaswamy et al., "Sensor Fusion for GNSS Denied Navigation", "IEEE/ION Position, Location, and Navigation Symposium", May 5, 2008, pp. 1-11, Publisher: IEEE.

Lerda, Flavio and Riccardo Sisto, "Distributed-Memory Model Checking with SPIN", "Lecture Notes in Computer Science", Jan. 1, 1999, pp. 22-39, vol. 1680, Publisher: Springer-Verlag.

Lin, Chung-Chen and Rey-Jer You, "Planar Feature Extration from LIDAR Data Based on Tensot Analysis", "available at: http://www.aars-acrs.org/acrs/proceeding/ACRS2006/Papers/M-1_M5.pdf", 2006, pp. 1-7, Publisher: Asian Association on Remote Sensing.

Lingemann et al., "High-Speed Laser Localization for Mobile Robots", "Robotics and Autonomous Systems", Jun. 2005, pp. 275-296, vol. 51, No. 4, Publisher: Elsevier B.V.

Lowe, D.G., "Distinctive Image Features from Scale-Invariant Keypoints", "International Journal of Computer Vision", Jan. 5, 2004, pp. 91-110, vol. 60, No. 2.

Manku, G. et al., "Structural Symmetry and Model Checking", "Lecture Notes in Computer Science", Jun. 28, 1998, pp. 159-171, vol. 1427, Publisher: Springer-Verlag.

Nister, "An Efficient Solution to the Five-Point Relative Pose Problem", "Pattern Analysis and Machine Intelligence", Jun. 2004, pp. 1-17, vol. 26, No. 6, Publisher: IEEE.

Norris IP, C. and David L. Dill, "Better Verification Through Symmetry", "IFIP Transactions", 1996, pp. 1-34, vol. 9, No. 1/2, Publisher: North-Holland Publishing Co.

Parra et al., "Robust Visual Odometry for Complex Urban Environments", "IEEE Intelligent Vehicles Symposium", Jun. 4-6, 2008, pp. 440-445, Publisher: IEEE, Published in: Eindhoven, The Netherlands.

Pauly et al., "Efficient Simplification of Point-Sampled Surfaces", "http://www.agg.ethz.ch/publications/journal_and_conference/#2002", Nov. 1, 2002, pp. 1-8, Publisher: IEEE Visualization 2002.
Pauly et al., "Uncertainty and Variability in Point Cloud Surface Data", "http://www.agg.ethz.ch/publications/journal_and_conference//#2004", 2004, pp. 1-8, Publisher: Symposium on Point-Based Graphics.
Pauly et al., "Point-Based Multi-Scale Surface Representation", "http://www.agg.ethz.ch/publications/journal_and_conference/#2006", Apr. 2, 2006, pp. 177-193, vol. 25, No. 2, Publisher: ACM Transactions on Graphics 2006.
De La Puente et al., "3D Feature Based Mapping Towards Mobile Robots' Enhanced Performance in Rescue Mission", Oct. 10, 2009, pp. 1-6, Publisher: IEEE.
De La Puente, "Extraction of Geometrical Features in 3D Environments for Service Robotic Applications", Sep. 24, 2008, pp. 441-450, Publisher: Springer-Verlag Berlin.
Rangarajan, M. et al., "Analysis of Distributed Spin Applied to Industrial-Scale Models", "Lecture Notes in Computer Science", Apr. 2004, pp. 1-19, vol. 2989, Publisher: Springer Verlag.
Rodrigo et al., "Robust and Efficient Feature Tracking for Indoor Navigation", "IEEE Transactions on Systems. Man.and Cybernetics—Part B: Cybernetics", Jun. 2009, pp. 658-671, vol. 39, No. 3, Publisher: IEEE.
Roncella, "Extraction of Planar Patches From Point Clouds to Retrieve Dip and Dip Direction of Rock Discontinuities", Sep. 12, 2005, pp. 162-167, vol. 3.
Sagues et al, "Robust line matching in image pairs of scenes with dominant planes", "Optical Engineering", 2006, pp. 1-12, vol. 45, No. 6.
Schnabel, "Efficient RANSAC for Point-Cloud Shape Detection", "Computer Graphics Forum", Jun. 2007, pp. 214-226, vol. 26, No. 2, Publisher: Blackwell Publishing.
Semwal et al., "Geometric-Imprints: A Significant Points Extraction Method for the Scan&Track Virtual Environment", Apr. 14, 1998, pp. 1-6, Publisher: IEEE.
Shapiro, Linda and Robert Haralick, "Relational Matching", "Applied Optics", May 15, 1987, pp. 1845-1851, vol. 26, No. 10, Publisher: Optical Society of America, Published in: Seattle, WA.
Soehren, Wayne and Wes Hawkinson, "Prototype Personal Navigation System", "IEEE A&E Systems Magazine; Based on Presentation at PLANS 2006", Apr. 2008, pp. 10-18, Publisher: IEEE.
Soloviev, Andrey, "Tight Coupling of GPS, Laser Scanner, and Inertial Measurements for Navigation in Urban Environments", "Proceedings of IEEE/ION Position, Location, and Navigation Symposium (PLANS 2008)", May 6-8, 2008, pp. 511-525, Publisher: IEEE.
Spero, D.J. and R. A. Jarvis, "Simultaneous Localisation and Map Building: The Kidnapped Way", "Intelligent Robotics Research Center MECSE-3-2007", 2005, pp. 1-12, Publisher: Monash University.
Stamos et al., "Integration of Range and Image Sensing for Photorealistic 3d Modeling", Apr. 24, 2000, pp. 1-8, Publisher: IEEE.
Steinhauser et al., "Motion Segmentation and Scene Classification from 3D LIDAR Data", "2008 IEEE Intellegent Vehicles Symposium", Jun. 4-6, 2008, pp. 398-403, Publisher: IEEE, Published in: Eindhoven, The Netherlands.
Stern, Urlich and David L. Dill, "Parallelizing the Mur Verifier", "Formal Methods in System Design", Jun. 22, 2001, pp. 117-129, vol. 18, No. 2, Publisher: Kluwer Academic Publishers.
Sara Susca, "GNSS—Independent Navigation Solution Using Integrated LiDAR Data", "Proceedings of the 2010 International Technical Meeting of the Institute of Navigation", Jan. 25-27, 2010, pp. 205-213, Publisher: ION.
"Tactical Advanced Land Inertial Navigator (TALIN)", Feb. 2007, pp. 1-2, Publisher: Honeywell International Inc.
Vedaldi et al., "On Viewpoint Invariance for Non-Planar Scenes", "UCLA CSD Technical Report #TR050012", Mar. 3, 2006, pp. 1-22.
"High Definition Lidar", "Available at http://www.velodyne.com/lidar accessed Jun. 9, 2010", 2008, p. 1, Publisher: Velodyne Acoustics, Inc.
Venable, Donald T., "Implementation of a 3D Imaging Sensor Aided Inertial Measurement Unit Navigation System", "Thesis", Aug. 2008, pp. 1-111, Publisher: Ohio University.
Veth et al., "Tightly-Coupled INS, GPS, and Imaging Sensors for Precision Geolocation", "Wright Patterson AFB, OH, http://www.docstoc.com/docs/1032359/Tightly-Coupled-INS-GPS-and-Imaging-Sensors-for-Precision-Geolocation", Jan. 2008, pp. 1-12, Publisher: Air Force Institute of Technology, Department of Electrical and Computer Engineering.
Von Hansen et al., "Cluster Analysis and Priority Sorting in Huge Point Clouds for Building Reconstruction", "Proceedings of the 18th International Conference on Pattern Recognition", Sep. 18, 2006, pp. 23-26, Publisher: IEEE.
Yang, "Plane Detection in Point Cloud Data", Jan. 25, 2010, pp. 1-16.
European Patent Office, "Office Action", "From Foreign Counterpart of U.S. Appl. No. 12/245,363", Feb. 12, 2013, pp. 1-6, Published in: EP.
European Patent Office, "European Search Report", "From Foreign Counterpart of U.S. Appl. No. 12/245,363", Jan. 30, 2013, pp. 1-4, Published in: EP.
Beucher, "The Watershed Transformation Applied to Image Segmentation", Sep. 1991, pp. 1-26, Published in: FR.
Gonzalez et al., "Segmentation by Morphological Watersheds", "Digital Image Processing (2nd Edition)", Jan. 15, 2002, pp. 617-626, No. 10.5, Publisher: Prentice-Hall.
Gu et al., "Vision-Aided UAV Navigation using GIS Data", Jul. 15, 2010, pp. 78-82.
Guo et al, "Vision-Based Drivable Surface Detection in Autonomous Ground Vehicles", "Proceedings of the 2006 IEEE/RSJ International Conference on Intelligent Robots and Systems", Oct. 9, 2006, pp. 3273-3278.
McKinnon, "Point, Line Segment, and Region-Based Stereo Matching for Mobile Robotics", Aug. 2009, pp. 1-126, Published in: CA.
Soille et al., "Determining watersheds in digital pictures via flooding simulations", "Visual Communications and Image Processing '90", Oct. 1990, pp. 1-11, vol. 1360.
Yokoya et al., "Range Image Segmentation Based on Differential Geometry: a Hybrid Approach", "8180 IEEE Transactions on Pattern Analysis and Machine Intelligence", Jun. 1989, pp. 643-649, No. 6.
Lukas et al., "Systems and Methods for Processing Extracted Plane Features", "U.S. Appl. No. 12/846,265", Jul. 29, 2010, pp. 1-30, Published in: US.
Dunik et al., "Systems and Methods for Evaluating Plane Similarity", "U.S. Appl. No. 13/242,701, filed Sep. 23, 2011", pp. 1-43.
Haag, "Implementation of a Flash-LADAR Aided Inertial Navigator", May 5, 2008, pp. 560-567, Publisher: IEEE.
Meier et al., "Object Detection and Tracking in Range Image Sequences by Separation of Image Features", "IEEE International Conference on Intelligent Vehicles", Oct. 1998, pp. 280-284.
Park et al., "Multiscale Surface Representation Scheme for Point Clouds", "Intelligent Signal Processing and Communication Systems, 2004", Nov. 18, 2004, pp. 232-237, Publisher: IEEE.
Pfister, "Multi-scale Point and Line Range Data Algorithms for Mapping and Localization", "Proceedings of the 2006 IEEE International Conference on Robotics and Automation", May 15, 2006, pp. 1159-1166, Publisher: IEEE.
Tseng et al., "Automatic Plane Extraction from LIDAR Data Based on Octree Splitting and Merging Segmentation", "Geoscience and remote Sensing Symposium 2005", Jul. 2005, pp. 3281-3284, vol. 5, Publisher: IEEE.
Zavodny et al., "Region Extraction in Large-Scale Urban LIDAR data", "2009 IEEE 12th International Conference on Computer Vision Workshops", Sep. 2009, pp. 1801-1808, Publisher: IEEE.

* cited by examiner

GENERIC SURFACE FEATURE EXTRACTION FROM A SET OF RANGE DATA

BACKGROUND

A global navigation satellite system (GNSS), such as the Global Positioning System (GPS), can be used to provide navigation information, e.g., position and velocity measurements for a sensor platform such as a vehicle, robot, or hand-held device. When a GNSS is not available, an inertial navigation system (INS) can be used to provide the position and velocity measurements or estimates by using inertial sensors and an integration algorithm. Pure strap down inertial navigation has drift, that is, the errors in estimated position increase with time. A range finder can be used as an aiding source to address the drift. A range finder can provide 3D range data corresponding to a distance between the range finder and objects in front of the range finder. Features can be extracted from the 3D range data to aid the INS.

SUMMARY

An example embodiment includes a method including receiving a three-dimensional set of range data including a plurality of points from one or more range finders. The method also includes extracting one or more surface features. Extracting includes segmenting the set of range data into a plurality of surfaces based on one or more edges, selecting one or more of the plurality of surfaces as the one or more surface features, and describing the one or more surface features based on a generic descriptor that can describe both planar and non-planar surface features. The method can also include using the one or more surface features to calculate one of a relative angle and orientation between the set of range data and at least one other set of range data, a rotation and translation of an object in the set of range data with respect to the object in at least one other set of range data, a rotation and translation between the set of range data with and at least one other set of range data, or a navigation solution based on the set of range data and at least one other set of range data.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
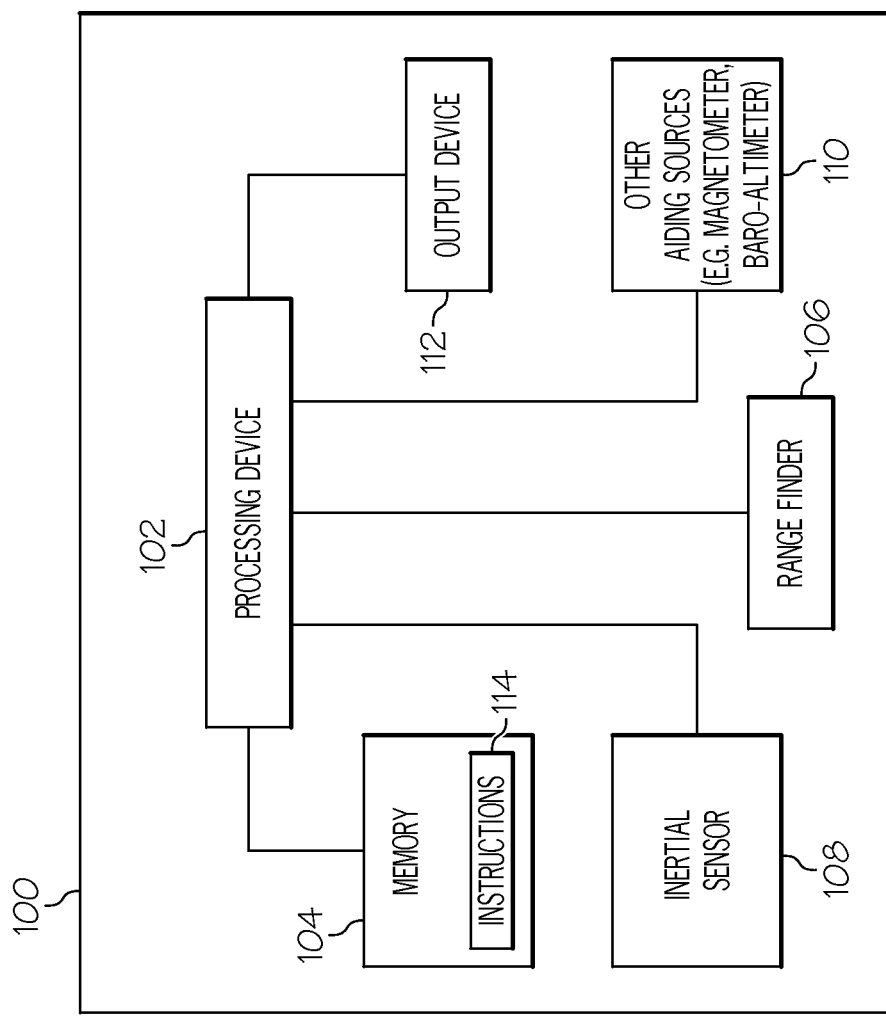
FIG. 1 is a block diagram of an example navigation system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The present inventors have recognized, among other things, that existing methods of feature extraction can rely on one or more specific geometric models (e.g., a plane, sphere) to represent features in the 3D range data. If the 3D range data does not fit into one of the available geometric models, the data is not considered as a feature. Geometric models, however, can be environment specific. A model suitable for one environment may not be suitable for another environment.

For example, an existing method uses plane features. Planes are extracted in two subsequent sets of range data and all possible combinations of pair of planes between the subsequent sets of range data are scored by a distance, which evaluates the similarity of the planes. Several pairs of planes having the smallest score (that are the most similar) are selected as matching.

Using plane features can provide acceptable results in indoor and urban outdoor environments. In a nature environment, however, the approach can fail. This is because the presence of significant planes is infrequent in such an environment.

FIG. 1 is a block diagram of an example navigation system 100. The navigation system 100 can include one or more processing devices 102 coupled to one or more memory devices 104. The navigation system 100 can comprise a platform (e.g., a physical structure) having a plurality of sensors mounted thereon. The plurality of sensors can include one or more range finders 106 (e.g., a light detection and ranging (LIDAR)) coupled to the one or more processing devices 102 and configured to capture range data and provide the range data to the one or more processing devices 102. The plurality of sensors can also include one or more inertial sensors 108 (e.g., gyroscope, accelerometer, etc.) coupled to the one or more processing devices 102 and configured to sense inertial movement and provide data indicative of the inertial movement to the one or more processing devices 102. The plurality of sensors can also include one or more aiding sources 110 (e.g., altimeter, magnetometer, satellite navigation system receiver, etc.) coupled to the one or more processing devices 102 and configured to provide navigation data to the one or more processing devices 102. The plurality of sensors mounted on the platform in a stationary physical relationship such that a direction cosine matrix between the sensors is fixed. In some examples, the navigation system 100 can include one or more output devices 112 (e.g., port, display device, speaker, etc.) coupled to the one or more processing devices 102 and configured to provide data to a user or another system.

The one or more processing devices 102 can include a central processing unit (CPU), microcontroller, microprocessor (e.g., a digital signal processor (DSP)), field programmable gate array (FPGA), application specific integrated circuit (ASIC) and other processing devices. The one or more processing devices 102 and the navigation system 100 can be "configured" to perform certain acts when the one or more memory devices 104 include instructions 114 which, when executed by the one or more processing devices 102, cause the one or more processing devices 102 to perform those acts. These instructions can implement the functions of the navigation system 100 as described herein. These instructions can be stored on any appropriate processor-readable medium used for storage of processor-readable instructions and/or data structures. This processor-readable medium can include the one or more memory devices 104 and/or other suitable media. Suitable processor readable media can include tangible media such as magnetic or optical media. For example, tangible media can include a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc. Suitable processor-readable media can also include transmission media such as electrical, electromagnetic, and digital signals, conveyed via a communication medium such as a network and/or a wireless link.

In an example, the navigation system 100 can be implemented in an aircraft (e.g., plane, jet, helicopter, etc.), spacecraft, land vehicle (e.g., rover), water vehicle, or other entity (e.g., missile). These entities can be autonomous, semi-autonomous, or human piloted.

The following description may refer to the one or more processing devices 102, the one or more memory devices 104, the one or more range finders 106, the one or more inertial sensors 108, one or more aiding sources 110, and the one or more output devices 112 in the singular form (e.g., the processing device 102); however, it should be understood that in many cases the singular form is used for simplicity and that use of the singular form may be not intended to limit these components to a single component (e.g., a single processing device 102) unless otherwise specified. Accordingly, although the singular form is used, it should be understood that in many cases one or more of the particular components can be used as indicated above.

The instructions 114 can be used in the processing unit 102 to perform a sequence of operations over a plurality of time steps. The processing unit 102 can acquire data from various sensors (e.g., inertial sensor 108, range finder 106, and aiding source 110). The processing unit 102 can apply a strapdown navigation algorithm to the inertial measurements and apply processing algorithms to the range data acquired from the range finder 106. The processing unit 102 can fuse the strapdown algorithm output with the range data and the measurements from the aiding sources 110 to generate estimates of the state of a sensor platform of the navigation system 100. This state can include the three-dimensional (3D) position, velocity, and attitudes. The output of the processing unit 102 is the navigation solution (e.g., the state of the sensor platform).

Figure 2:
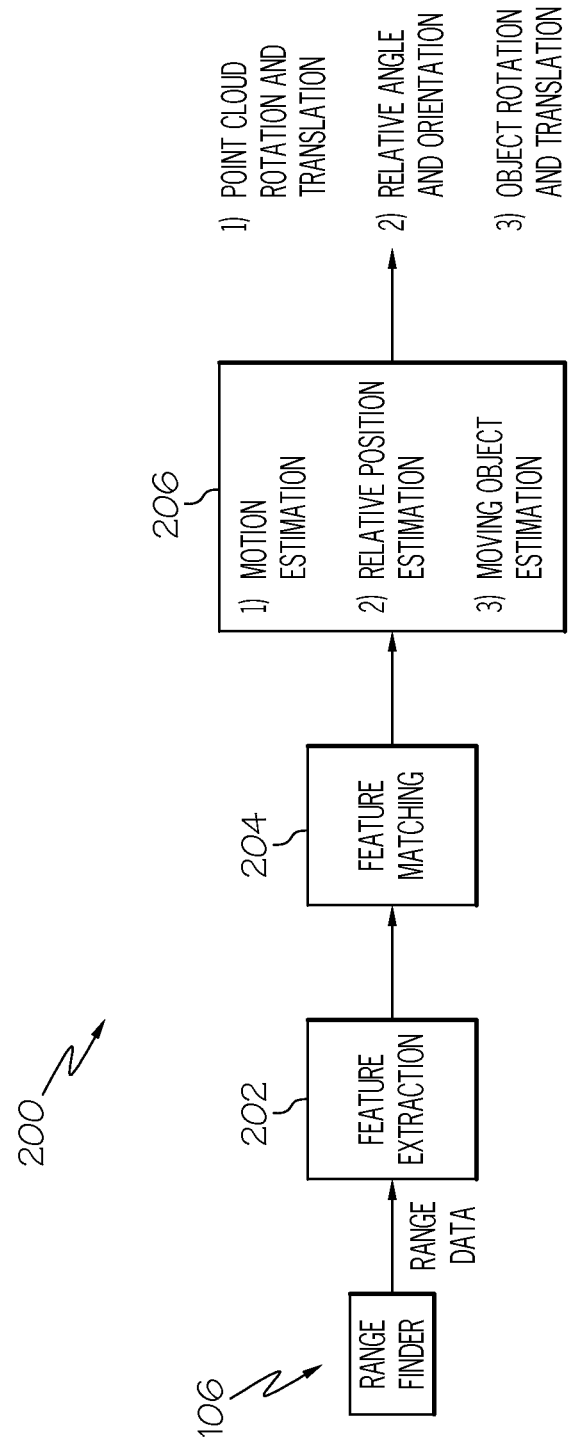
FIG. 2 is a flow diagram of an example method for motion estimation for which the navigation system of FIG. 1 can be configured to perform.

FIG. 2 is a flow diagram of an example method 200 for motion estimation for which the navigation system 100 can be configured to perform. As described below, the method 200 can also be used for estimating a relative position between a first set of range data and one or more other sets of range data, or to estimate motion of an object in a first set of range data with respect to one or more other sets of range data. The instructions 114 can be configured to, when executed by the processing device 102, cause the navigation system 100 to implement method 200.

The method 200 can include receiving a plurality of sets of range data (e.g., from the range finder 106). A set of range data can correspond to a 3D range image or 3D point cloud captured by the range finder 106. That is, a set of range data can correspond to a capture of a given real world scene at a given time by the range finder.

At block 202, a plurality of features can be extracted from two or more sets of range data. In an example, the plurality of features can include one or more point features, one or more edge features, and/or one or more surface features. An edge feature can be extracted in any appropriate manner (e.g., using edge based segmentation or region growing). For example, a point feature can be extracted based on an intersection of two or more surfaces. Extraction of surface features can be generic such that both planar and non-planar surface features can be extracted if present. A point feature can be extracted based on an intersection of three or more surfaces. In some examples, a point feature corresponds to a point having a significant property with respect to a neighborhood of points. For example, a point feature might or might not have any direct geometrical interpretation and can be independent of a corner, edge, or surface feature. More detail regarding feature extraction is provided with respect to FIGS. 3 and 5.

At block 204, a plurality of matching features can be identified between a first set of 3D range data and one or more other sets of 3D range data. In an example, feature matches can be identified based on a similarity between descriptors for two features. The similarity between descriptors can be measured in any appropriate manner including by an information measure such as a norm or a statistical correlation. In an example, matches between surface features can be identified based on one of the correlation or mutual information between the two surface features.

At block 206, the plurality of matching features can be processed to determine a positional relationship between the matching features. This positional relationship can be used for one or more of several purposes. For example, if a first set of range data is captured from a first range finder at a first time of a first scene and one or more other sets of range data are captured from the first range finder at a later time of at least a portion of the first scene, the positional relationship can be used to estimate of motion between a first set of range data and one or more other sets of range data. This estimation of motion can be output as a change in rotation and translation between the first set of range data and the one or more other sets of range data. The estimation of motion can then be used to aid in navigational as explained in more detail with respect to FIGS. 7 and 8.

As another example, if the first set of range data is captured of a first scene from a first range finder and a second set of range data is captured of the first scene from a second range finder, the positional relationship can be used to estimate a relative position between the first range finder and the second range finder.

Finally, if a first set of range data is captured from a first range finder at a first time of a first scene and one or more other sets of range data are captured from the first range finder at a later time of at least a portion of the first scene, and an object within the scene has moved relative to other objects, the positional relationship can be used to estimate motion of the object.

Figure 3:
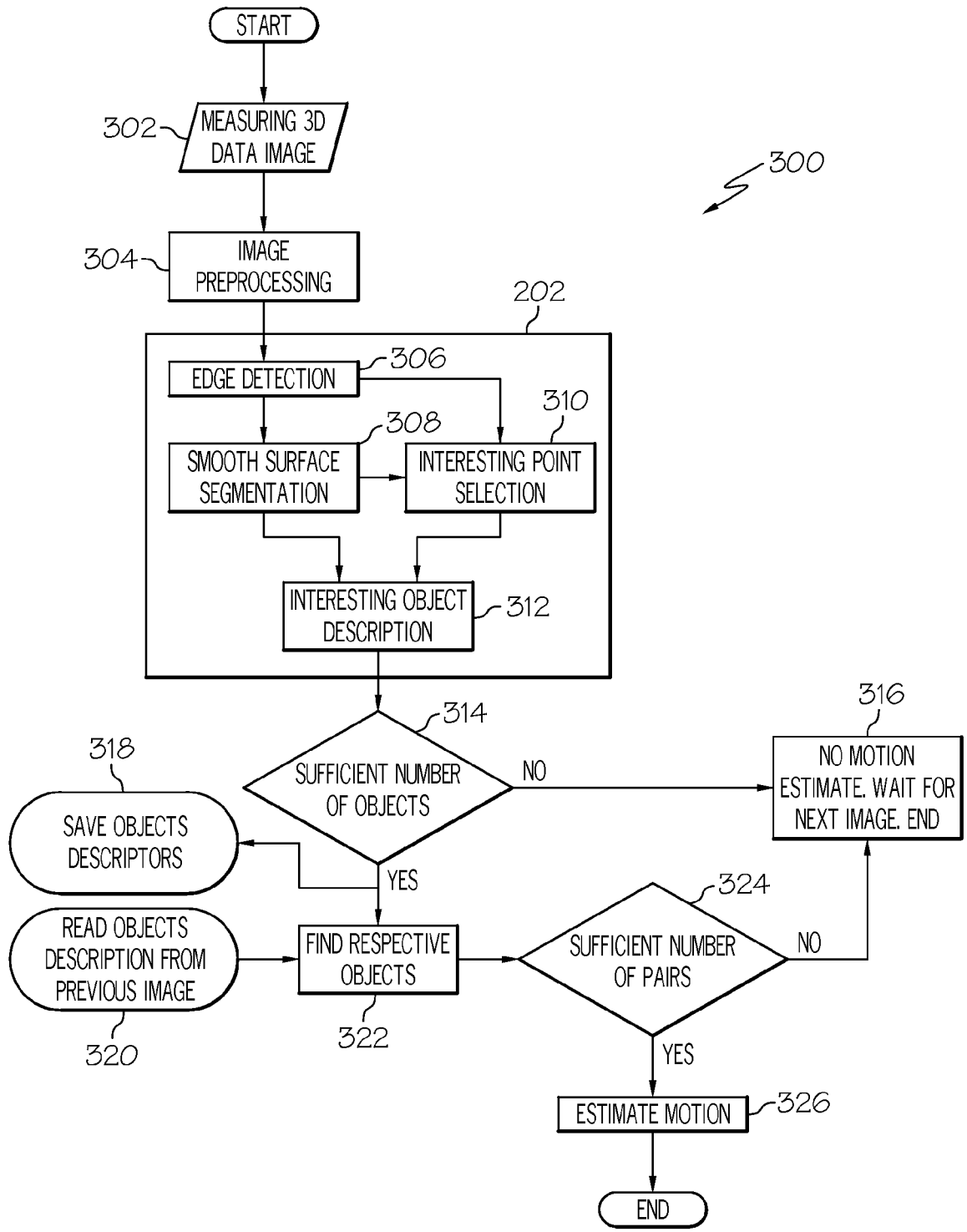
FIG. 3 is a flow diagram of an example method for estimating motion for which the navigation system of FIG. 1 can be configured to perform.
Figure 4A:
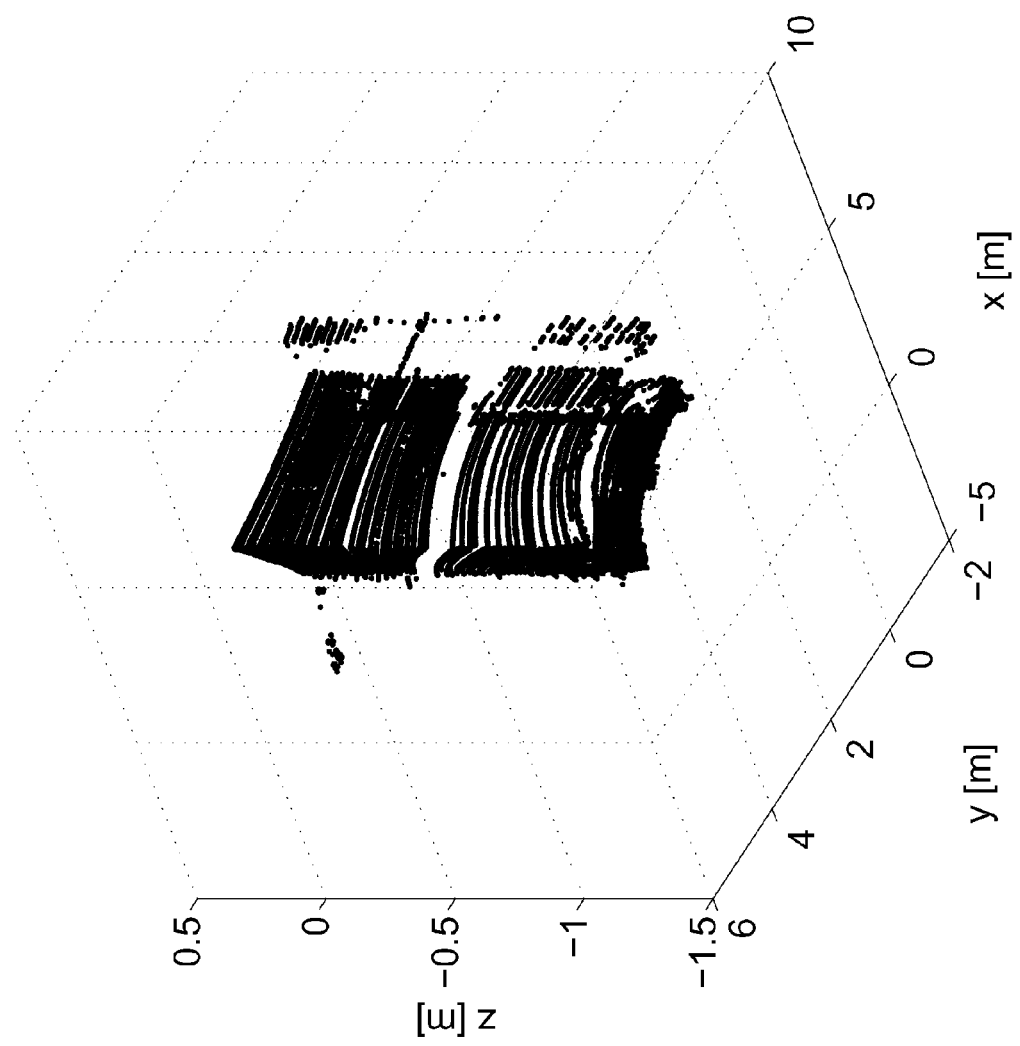
FIG. 4A is a graph of an example organized set of range data, wherein the organized set of range data is rendered based on the range of each point.

FIG. 3 is a flow diagram of an example method 300 for estimating motion with the navigation system 100. At block 302, a set of range data can be captured by a range finder 106. The set of range data can include a plurality of points wherein a point includes a range for a given elevation and azimuth from the range finder 106. In an example, the set of range data can be organized (e.g., tabularized) based on elevation and azimuth for each point. In an example, the set of range data can be organized into a table of size 64×4096, however, the size and shape of the table is based on the number and azimuth for data points captured by the range finder as well as on selected requirements. FIG. 4A is a graphical example of an organized set of range data, wherein the organized set of range data is rendered based on the range of each point. When illustrated in this way, the object(s) from which the range data was captured can be seen.

At block 304, the set of range data can be pre-processed. Pre-processing can exclude one or more areas within the set of range data with a low number of laser returns, a laser return strength below a threshold value, or both. Since measurements (if any) obtained from these areas are likely inaccurate, these areas can be excluded from further processing by removing points corresponding to these areas from the plurality of points or by setting points corresponding to these areas to have no value. In FIG. 4A an area in the right center with no data can be observed.

Figure 4B:
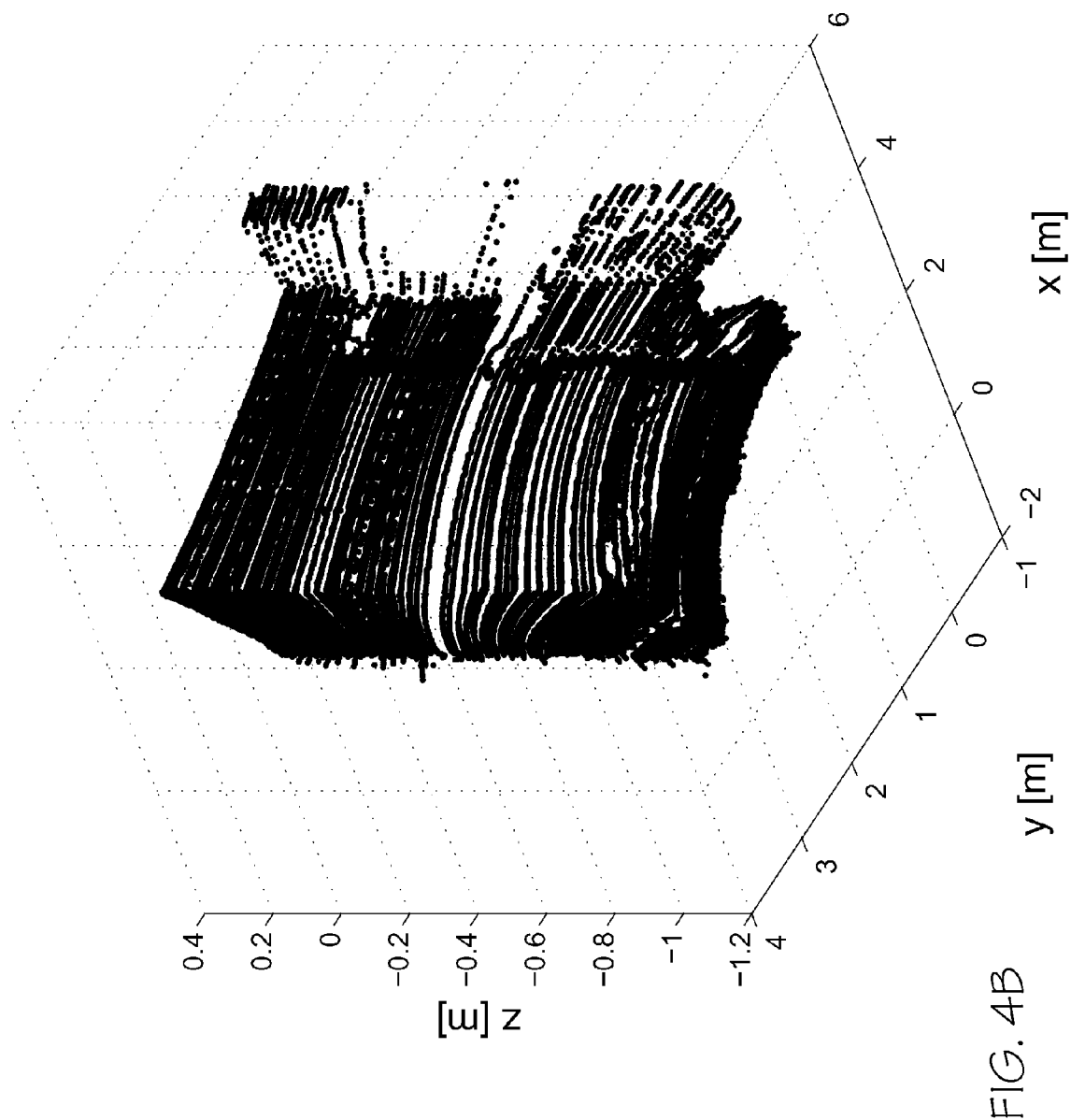
FIG. 4B is a graph of an example of the organized set of range data of FIG. 4A after pre-processing.

Pre-processing can also include interpolating the set of range data to estimate a value for one or more points with no value. Thus, the value of a point with no value can be interpolated based on the values of neighboring points. Interpolating to fill in points with no value may enable fast segmentation using linear operators. This can also include correction of points in case of a broken or malfunctioning range finder. Pre-processing can also include filtering the set of range data to suppress noise and to remove outliers. FIG. 4B is a graphical example of the set of range data in FIG. 4A after pre-processing. As can be seen, many of the points with no value have been filled in via interpolation and outliers have been removed.

Blocks 306, 308, 310, and 312 correspond generally to feature extraction (block 202 of method 200) for the set of range data. As mentioned above, feature extraction can include extracting one or more surface, edge, and/or point features. Feature extraction can include segmentation of the set of range data followed by selection and description of the features. Blocks 306 and 308 correspond generally to segmentation of the range data. Block 308 also corresponds to selection of surface features, while block 310 corresponds to selection of point and edge features. Block 312 corresponds to description of the features that were selected at blocks 308 and 310.

At block 306, edges are detected within the set of range data. Edge detection can include classifying the plurality of points of the set of range data into a first set of points corresponding to one or more edges and a second set of points corresponding to one or more surfaces. In an example, edge detection includes identifying step edges and roof edges within the plurality of points. A step edge correspond to an edge between physically separated (e.g., non-intersecting) surfaces and can be identified, for example, based on discontinuity in range values among points. A roof edge corresponds to an edge between intersecting surfaces (e.g., wall corners, etc.) such that the edge has continuous range values between surfaces. Roof edges, therefore, can be identified, for example, based on changes in orientation between the surfaces. In any case, points corresponding to an edge, both step and roof, are classified as edge points and all other points are classified as surface points.

At block 308, a plurality of surfaces can be identified in the set of range data. The plurality of surfaces can be identified based on the classification of edge points and surface points at block 306. For example, once the points are classified as corresponding to an edge or surface, the surface points (i.e., points classified as a surface) are further classified as corresponding to one of a plurality of surfaces in the set of range data. Surface points can be classified as corresponding to a specific surface by identifying areas of surface points that are surrounded by an edge. That is, a group of surface points that have no dividing edges and are surrounded by edge points and the edge of the point cloud can be classified as a single surface. Each of the surface points can be classified in this manner until all surface points have been classified as corresponding to one of a plurality of surfaces in the set of range data.

Blocks 306 and 308 describe one example of segmentation of the set of range data using an edge-based approach. In other examples, other methods of segmentation can be used including region growing and scanline-based segmentation.

As mentioned above, block 308 can also correspond to selection of surface features. A surface identified can be selected as a surface feature based on characteristics of the surface. For example, a distant surface in front of a larger surface can be selected as a surface feature. Such a surface feature can be identified based on the surface being substantially surrounded by (e.g., separated by a step edge from) points having generally larger ranges (e.g., corresponding to a second larger surface). Surfaces such as these may make robust features as they can be less prone to occlusions in the subsequent range finder scans.

At block 310, point and edge features can be selected. Edge features can be selected in any appropriate manner. For example, an intersection of two surfaces can be selected as an edge feature. Point features can be selected based on unique properties with respect to their neighborhoods (e.g., having the highest gradient or other property preferably invariant to rotation and translation). Also, an intersection of three or more surfaces or three or more roof edges can be selected as a point feature corresponding to a corner. A point having some other unique property can also be selected as a point feature. For example, a point surrounded by a single surface (e.g., the point of cone) can also be selected as a point feature. In an example, a point or a small group of points having a sum of residuals that is a threshold amount larger that of surrounding points can be selected as a point feature. The threshold can be 1.5, 3, or another amount times larger than surrounding points.

At block 312, the selected features (edge, point, and/or surface) can be described. In an example, a surface feature can be described using a generic descriptor that can describe both planar and non-planar surfaces features. For example, a generic descriptor can include a descriptor based on the statistical properties of the subset of points (e.g., mean value, covariance matrix including its eigenvalues and eigenvectors, higher order moments, estimated probability density function), because the surface feature is a subset of (range) points. Similarly, a generic descriptor can include a descriptor based on quantities used in differential geometry such as, but not limited to, various curvature measures. In an example, a generic descriptor can include a descriptor based on eigenvalues of a covariance matrix of points forming the surface feature. Such a descriptor can be used because it is invariant to rotation or translation and can therefore provide a good means for matching surface features captured from different locations. In yet another example, a generic descriptor can include a descriptor based on a distance of the surface feature and its neighborhood or other features. For example, a surface feature can be described using an information measure such as mutual information, Kullback-Leibler distance/divergence, Jensen-Shanon divergence, Bhattacharyya distance, Hellinger distance, and the like. Such descriptors can under certain assumptions (e.g., a Gaussian distribution of the range data) be invariant with respect to rotational or translational motion.

In an example, a surface feature selected at block 308 can be described in an object specific manner. For example, the surface feature can be recognized as a certain object (e.g., shape) and described in a manner corresponding to the object that is recognized. Different objects can have different descriptors such that a first surface feature recognized as a first object can be described according to descriptors corresponding to the first object and a second surface feature recognized as a second object can be described according to descriptors corresponding to the second object. In an example, the surface feature can be described based on a geometric representation of the object. A surface feature recognized as a plane can be described by a normal vector and distance. A surface feature recognized as a sphere can be described by center coordinates and a radius. A surface feature recognized as an automobile can be described with parameters corresponding to an automobile. Other objects can be recognized.

In an example, a point feature selected at block 310 can be described based on gradient information. In an example, an edge feature can be described using known edge descriptors. Surface, edge, and point features can also be described based on a distance (e.g., information, Euclidian, and the like) with respect to other selected features.

At block 314, it can be determined whether a sufficient number of extracted features can be obtained from the set of range data to enable use of the extracted features for meaningful matching with features extracted from another set of range data. If there are a sufficient number of extracted features, the extracted features can be used at bock 322 for matching with extracted features from another set of range data. The extracted features can also be stored (block 318) for later feature matching at block 322 after processing another set of range data through blocks 302-314. If there are not a sufficient number of features, then the extracted features, if any, can be discarded and the next set of range data can be processed through blocks 302-314. In some examples, even if there are an insufficient number of extracted features, the extracted features can be stored for later use computing a partial navigation solution.

At block 322, if there are a sufficient number of extracted features from two sets of range data, the extracted features from the two sets of range data can be compared to identify any matching features. This comparison of extracted features can be referred to as data association or matching. For example, a first set of range data is processed through blocks 302-314 and the extracted features can be stored (block 318). A second set of range data is also processed through blocks 302-314. The extracted features from the first set of range data can be read (block 320) and can be compared to the extracted features from the first set of range data to identify any matching features. In an example, matching features can be identified by one-to-one matching (e.g., based-on cross-correlation matching, various norms (e.g., Euclidian), informational measures (e.g., mutual information, Kullback-Leibler distance/divergence, Jensen-Shanon divergence, Bhattacharyya distance, Hellinger distance)). In an example, matching features can be identified based on a distance between descriptors of the extracted features. For example, a first extracted feature can be considered to match a second extracted feature if the distance (e.g., Euclidian) between the descriptors of the first and second extracted features is below a distance threshold and the distance is the smallest distance as compared to potential matches with other extracted features. In another example, a first extracted feature can be considered to match a second extracted feature if one of the correlation or mutual information between the two extracted features is above a threshold and is the largest as compared to potential matches with other extracted features.

In another example, matching features can be identified by relational matching, in which case no individual descriptors are used. For example, mutual relations (e.g., distance) between groups of features can be used to establish correspondences. Relational matching can match correspondences of multiple pairs of features.

At block 324, if a sufficient number of pairs of matching features (e.g., three pairs) are identified between the first set of range data and the second set of range data at block 322, then motion (e.g., a full navigation solution) can be estimated at block 326. If a sufficient number of pairs of matching features are not identified, then either motion is not estimated (block 316) or a partial navigation solution can be estimated. At block 326, frame motion, relative position, or object motion can be estimated as described with respect to block 206 of FIG. 2.

Figure 5:
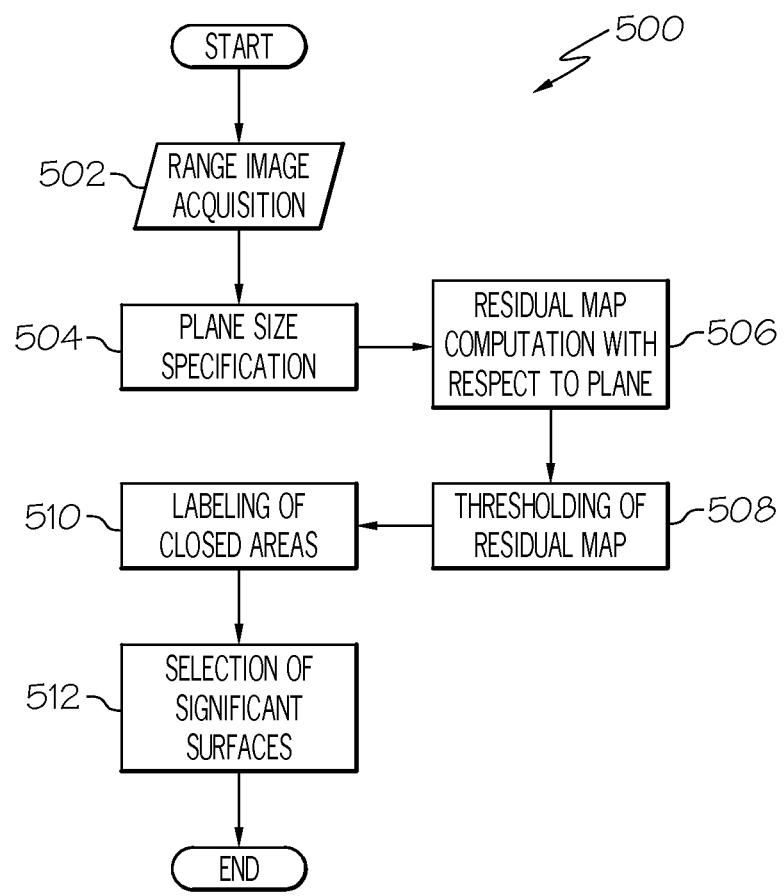
FIG. 5 is a flow diagram of an example method for edge detection, segmentation, and feature extraction for which the navigation system of FIG. 1 can be configured to perform.

FIG. 5 is a flow diagram of an example method 500 for segmentation and surface feature selection with the navigation system 100. In method 500, block 502 corresponds to blocks 302 and 304 of method 300, blocks 504, 506, and 508 correspond to block 306 of method 300, and blocks 510 and 512 corresponds to block 308 of method 300.

At block 502, a set of range data can be captured by a range finder 106 and pre-processed as described with respect to block 304. The set of range data can include a plurality of points wherein a point includes a range for a given elevation and azimuth from the range finder 106. In an example, the set of range data can be organized (e.g., tabularized) based on elevation and azimuth for each point. In an example, the set of range data can be organized into a table of size 64×4096, however, the size and shape of the table is based on the number and direction of data points captured by the range finder. FIG. 4A is a graphical example of an organized set of range data, wherein the organized set of range data is rendered based on the range of each point. When illustrated in this way, the object(s) from which the range data was captured can be seen.

The edge detection of blocks 504, 506, and 508 can comprise classifying points of the set of range data as corresponding to an edge (e.g., a step edge, roof edge, or other discontinuity) or a surface (e.g., a smooth and/or continuous surface). In an example, a point can be classified based on the residuals from fitting a plane to a neighborhood of points surrounding the point. A point belonging to a smooth and continuous surface should have small residuals. That is, a plane should fit the surface well. On the other hand, a point belonging to an edge should have significantly higher residuals. That is, a plane should not fit well.

In an example, at each point of a tabularized and pre-processed set of range data the similarity of the neighborhood of the point and a plane can be computed. The similarity is in this example measured by a sum of squared residuals (i.e., the distance between a measured point and a fitted plane). Other measures (e.g., mean or maximal distance, etc.) can be used as well. Points in the set of range data having large value of residuals can be further considered to be edge points with the remaining to be surface points. The description below of blocks 504, 506, and 508 provides additional detail.

At block 504, the size of the neighborhood surrounding the point (i.e., the window or mask size) that is to be used to compare to a fitting plane is determined. In an example, for a table of size 64×4096, the neighborhood is 7×31, that is, m=7 points by n=31 points in the table. In other examples, other sizes of neighborhoods either fixed or adaptive can be used. For example, an adaptive size can be used to adjust the neighborhood size based on a size of the object, which should be recognizable, and the distance from the range finder 106 to the object. For example, an object of size 2×2 meters can produce, for example, 8×10^4 laser returns (points) if the distance between the object and the range finder 106 is, for example, 2 meters. However, the same object at a distance of 60 meters will produce, for example, 150 laser returns. Therefore, for use in environments where the distance between the range finder 106 and objects of interest is generally constant a fixed size neighborhood can be used. In situations when the object can be at a widely variable distance an adaptive size neighborhood can be used. For an adaptive size neighborhood, each point in a set of range data can be specified based on the measured range information such that increasing range corresponds to a decreasing neighborhood size). The neighborhood size (m, n) can also be a function of vertical and horizontal angular resolution of the range finder 106 and the measurement accuracy.

At block 506, with the specified neighborhood for each point in the range table a fit of a plane can be estimated with the neighborhood. The fit of a plane for a point can be estimated by computing the sum of squared residuals for the point and its neighborhood. For a particular point of the range table R a size of a neighborhood (m, n) is provided as described above. For example, for point (i,j) point in table the neighborhood for plane fitting is $N_{ij}=\{R(i-m/2, j-n/2), \ldots, R(0,0), R(i+m/2, j+n/2)\}$. Based on the data in $N_{ij}$, it is possible to estimate (using, for example, the least-squares method) fitting plane parameters and mainly to compute the sum of squared residuals. Repeating the residual computation for all points in the table, creates a residual table (residual map). The residual table is the same size as the (range) table. In other examples, other values than sum can be used. For example, single value, mean of values, product of values, weighted sum, median, etc. can be used. The basic idea of this approach is that any discontinuity (e.g., roof or step edge) in the (range) table corresponds to a high value in the residual table which can be more easily detected than the discontinuity in the (range) table.

At block 508, each point in the set of range data (range table) can be classified as corresponding to an edge or a surface based on a threshold for the residual (in the residual table) of the given point. If a sum of residuals for a particular point in the range table is above the threshold, the point is classified as corresponding to an edge and if the sum of residuals is below the threshold, the point is classified as corresponding to a surface. This can be repeated for each point in the set of range data such that the points are classified as corresponding to an edge or as corresponding to a surface. In an example, the threshold can be set based on empirical evidence. In another example, the threshold can be adaptive. An adaptive threshold can be used since different edges can produce different value of sum of residuals. An adaptive threshold technique can include using a ridge detection technique, which finds a local maxima, for the residual table and subsequently some set of image enhancement techniques like techniques for edge detection and edge linking. Since a surface is continuous and generally smooth, the surface will have a small sum of residuals and hence can be classified as a surface by having a sum of residuals below the threshold, either fixed (global) or adaptive (local). Likewise, a step edge will be discontinuous in range and have a larger sum of residuals as will a roof edge due to the change in orientation at the edge. Accordingly, both roof and step edges can be captured by classifying points having a sum of residuals above the threshold, either fixed (global) or adaptive (local), as corresponding to an edge.

Figure 6A:
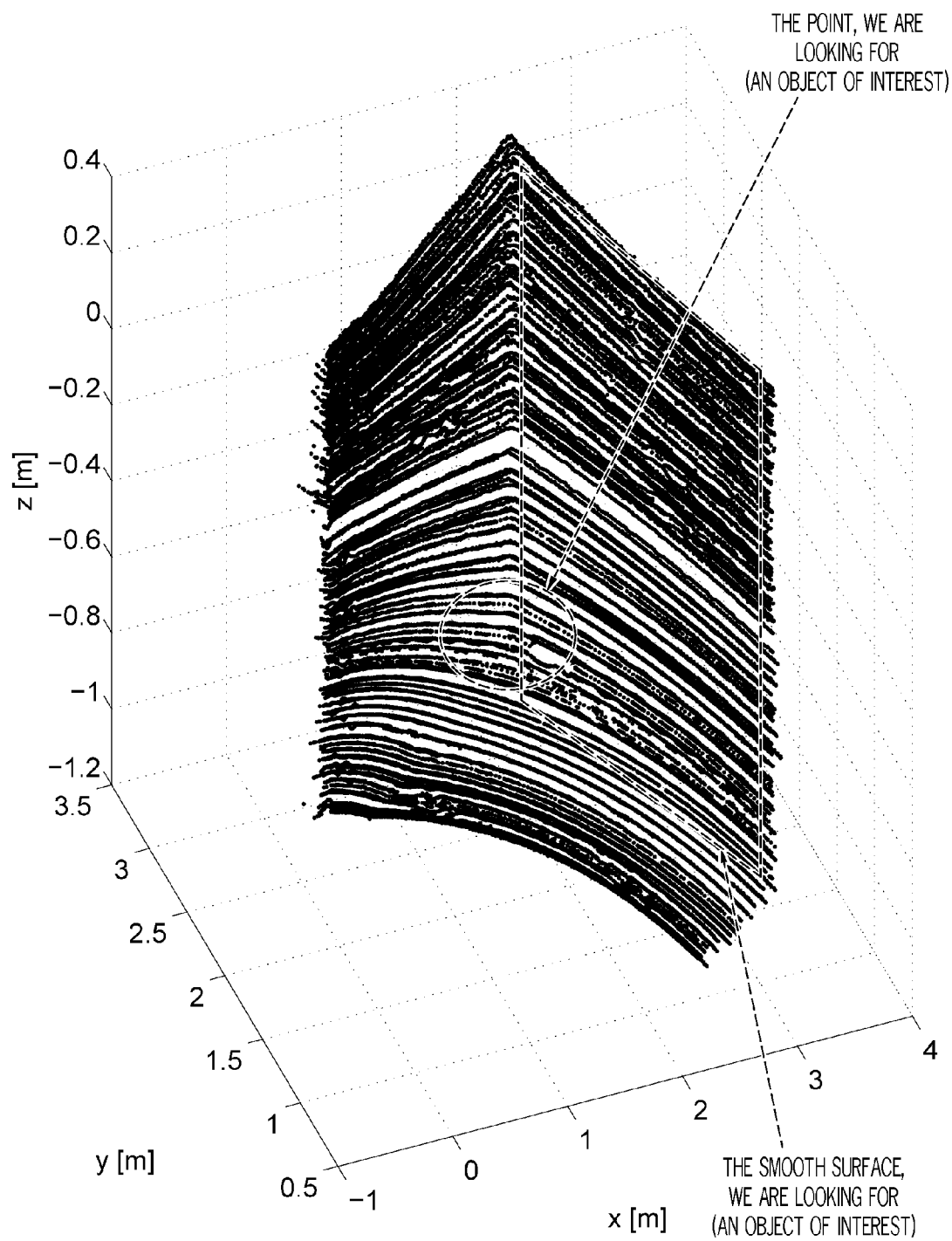
FIG. 6A is a graph of an example of the organized set of range data of FIG. 4A showing a surface feature and a point feature.
Figure 6B:
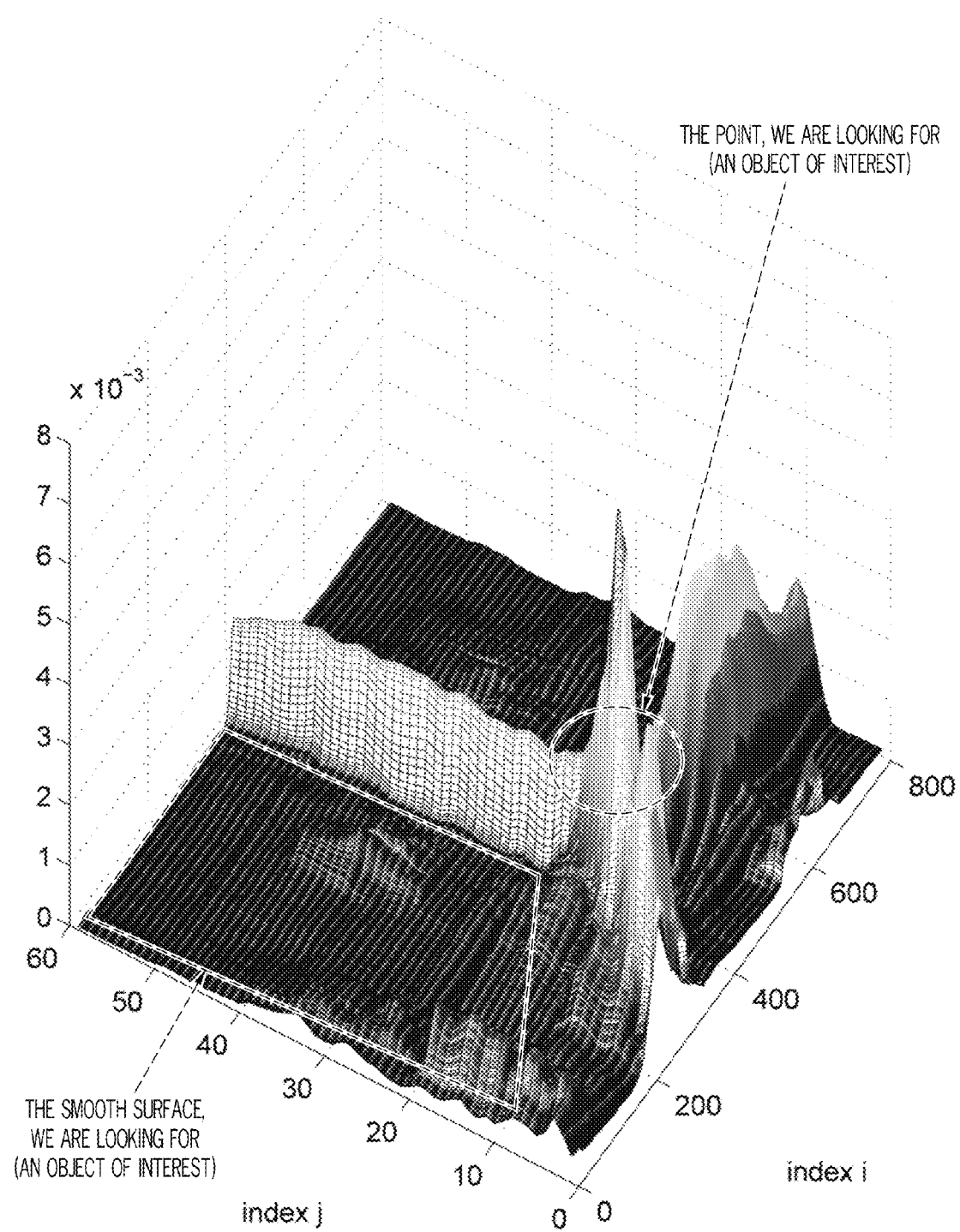
FIG. 6B is a graph of an example of a residual map of the organized set of range data of FIG. 6A showing a surface feature and a point feature.

FIG. 6A is a graph illustrating an example set of range data and FIG. 6B is a residual map of the example set of range data. Similar to FIG. 4B, FIG. 6A is a pre-processed and table organized set of range data, wherein the organized set of range data is rendered based on the range of each point. Accordingly, two or more surfaces can be visualized in the set of range data with an edge (corner) between the two or more surfaces. When the sum of residuals is calculated for each point of the set of range data in FIG. 6A, the residual map illustrated in FIG. 6B is created. As shown, the surfaces in the set of range data correspond to lower values for the sum of residuals, while edges correspond to higher values for the sum of residuals. An intersection of three edges (e.g., an intersection of three surfaces) may lead to a significantly larger sum of residuals than surrounding points (e.g., forming a spike in the residual map) due to the multiple different surfaces. Accordingly, a threshold can be used to separate the edge points from the surface points.

The threshold can be set above zero such that points corresponding to non-planar, as well as planar, surfaces can be classified as corresponding to a surface. That is, since a point having a neighborhood with a slight curvature (e.g., as a point in a larger sphere) can have a lower sum of residuals than a discontinuity, the point can be classified as corresponding to a surface while a point corresponding to a discontinuity can be classified as corresponding to an edge. Additionally, a fixed threshold can be set based on the desired curvature (and also with consideration of the range measurement accuracy) that is to be captured as a surface. That is, if only surfaces with no or very slight curvature (e.g., a plane, a slightly convex surface) are to be classified as surfaces, with sharper curves being classified as edges, the threshold can be set to a lower value. This may reduce errors in surface identification since sharp curves will be classified as edges. If, however, more surfaces are to be identified including surfaces with sharper curves, the threshold can be set higher. This may enable more surfaces to be identified, and therefore extracted as features, but may yield more errors. In any case, however, points corresponding to both planar and non-planar surfaces can be classified as corresponding to a surface.

At block 510, the points in the range table classified as corresponding to a surface according to the residual table at block 508 are further classified to determine which of the plurality of surfaces in the set of range data that the points correspond to. The set of range data will likely have captured multiple surfaces. These surfaces can be individually identified based on the edges between the surfaces. Accordingly, a group of surface points (e.g., points classified as corresponding to a surface at block 508) that is contiguous and surrounded by edge points (e.g., points classified as corresponding to an edge at block 508) or an exterior edge of the set of range data can be classified as a first surface. For example, the smooth surface identified in FIG. 6A can be identified because the surface is substantially surrounded by edge points and the exterior edge of the set of range data as shown in FIG. 6B. This edge based segmentation can continue in order to classify all surface points as corresponding to one of a plurality of surfaces in the set of range data.

At block 512, once the surface points are classified to one of the plurality of surfaces identified through segmentation at block 510, significant surfaces can be selected for feature extraction (block 308). Accordingly, insignificant surfaces can be removed and significant surfaces can be preserved (selected as surface features). As described above, significant surfaces can include surfaces that are somehow unique, for example, in terms of area, shape, distance from range finder 106 or other surfaces, etc. An example of a surface feature is shown in FIG. 6B.

Figure 7:
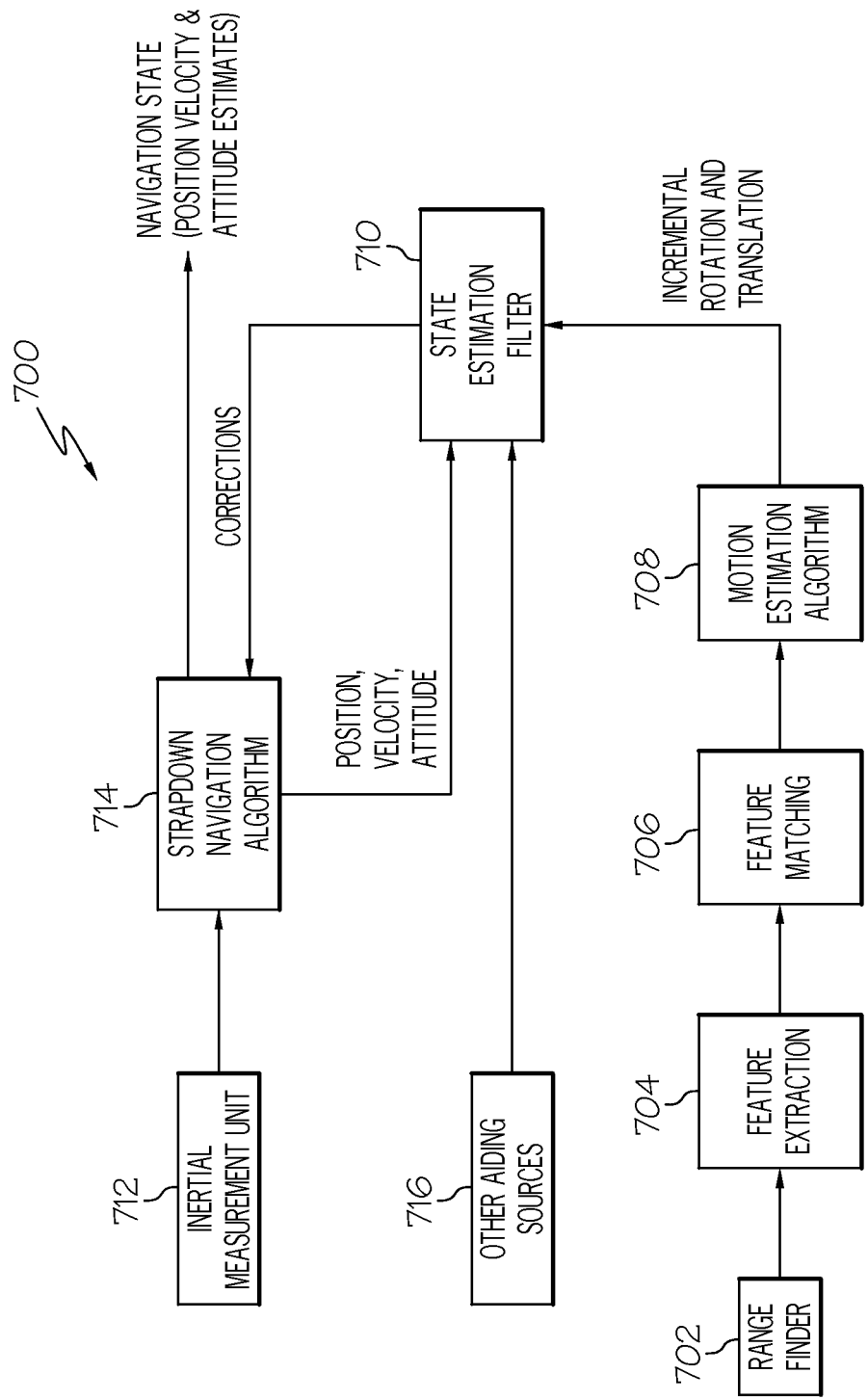
FIG. 7 is a block diagram of an example method for navigation using the feature matches identified by the method of FIG. 3.

FIG. 7 is a block diagram of an example method 700 for navigation using feature matches identified by the method 300 with details given in method 500. At block 702, one or more sets of range data are captured by the range finder 106. At block 704 features can be extracted from these one or more sets of range data as described with respect to block 202 of method 200, blocks 306-312 of method 300, and blocks 502-512 of method 500. At block 706 the extracted features from multiple sets of range data can be matched as described with respect to block 204 of method 200 and block 322 of method 300. At block 708, a motion estimation algorithm can be applied to the feature matches to generate incremental rotation and translation between the sets of range data as described with respect to block 206 of method 200 and block 326 of method 300. This motion estimation can be input into a state estimation filter (block 710), including but not limited to, a Kalman filter, Extended Kalman filter, Unscented Kalman filter, Particle filter, Gaussian sum filter, etc.

Additionally, at block 712, an inertial sensor 108 can sense inertial data and a strapdown navigation algorithm 714 can be used to process the outputs of the inertial sensor 108. The outputs of the strapdown algorithm 714, the aiding sensor (716) and the incremental rotation and translations from the motion estimation at block 708 can be fused using a state estimation filter at block 710. The state estimation filter can provide corrections to the strapdown navigation algorithm 714. These corrections can be applied by the strapdown navigation algorithm 714 to determine the navigation solution (e.g., position, velocity, and attitude).

Figure 8:
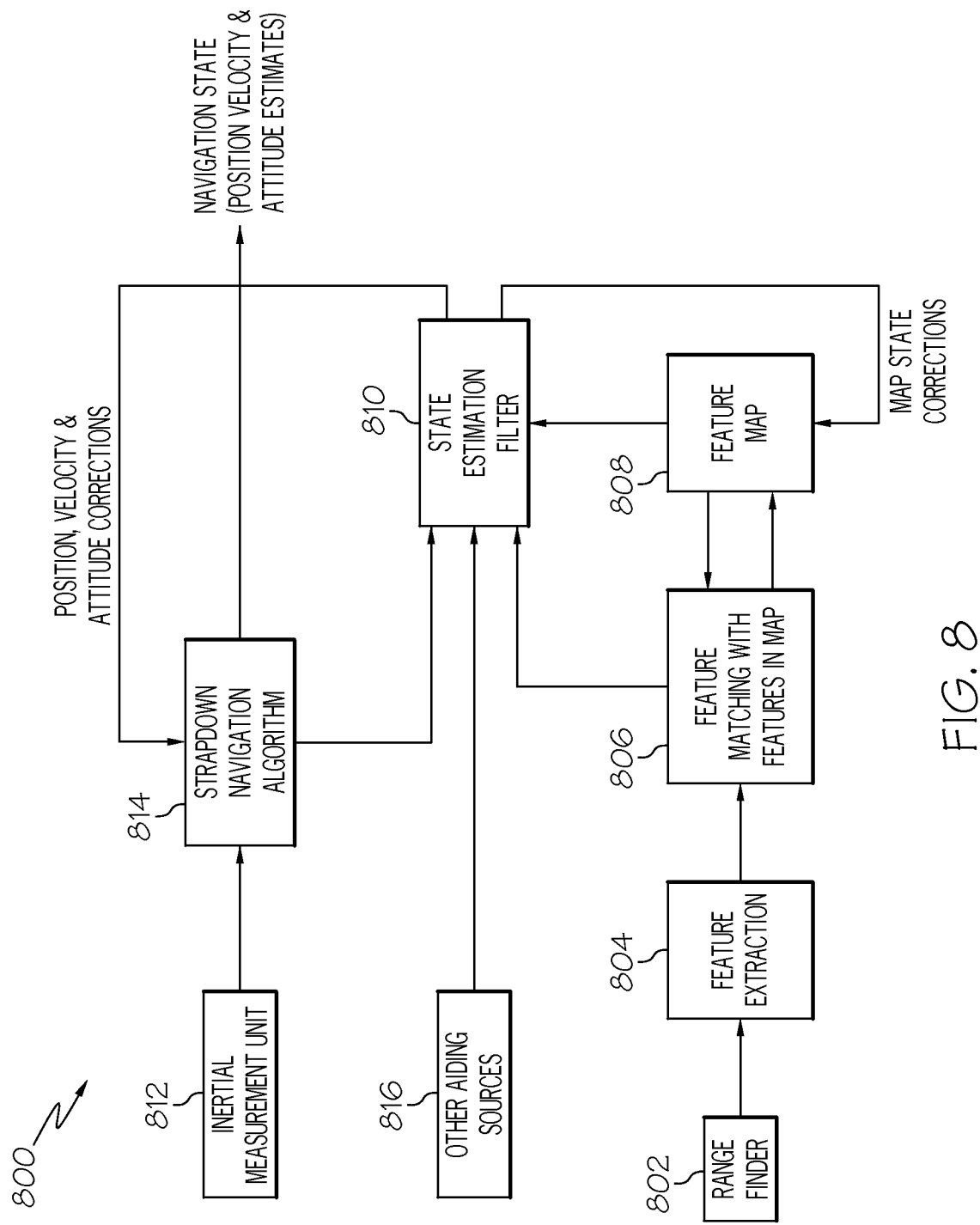
FIG. 8 is a block diagram of an example method for simultaneous localization and mapping (SLAM) using the feature matches identified by the method of FIG. 3.

FIG. 8 is a block diagram of an example method 800 for simultaneous localization and mapping (SLAM) using the feature matches identified by the method 300. At block 802, one or more sets of range data can be captured by a range finder 106. At block 804 features can be extracted from these one or more sets of range data as described with respect to block 202 of method 200, blocks 306-312 of method 300, and blocks 502-512 of method 500. At block 806 the extracted features from multiple sets of range data can be matched as described with respect to block 204 of method 200 and block 322 of method 300. At block 808, a feature map can be maintained based on the feature matches at block 806. The feature matches corresponding to features in the map can be input to a state estimation filter (block 810).

Additionally, at block 812, an inertial sensor 108 can sense inertial data and a strapdown algorithm 814 can be used to process the outputs of the inertial sensors. The outputs of the strapdown algorithm 814, the other aiding sensor 816 and the coordinates of the true feature matches from the map 808 can be fused using the state estimation filter 810. The state estimation filter can then provide corrections to the strapdown navigation algorithm 814 and also corrections to the map 808. The corrections sent to the strapdown algorithm 814 can be applied by the strapdown navigation algorithm 814 to determine the navigation solution (e.g., position, velocity, and attitude).

It should be understood that the SLAM implementation can vary and the depiction in FIG. 8 is only an example SLAM implementation. For example, in other implementations some blocks of FIG. 8 can be performed together, for example but not limited to Strapdown navigation algorithm (block 814) being performed with a state estimation filter (block 810).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
receiving a three-dimensional set of range data including a plurality of points from one or more range finders;
extracting one or more surface features, wherein extracting includes:
segmenting the set of range data into a plurality of surfaces based on one or more edges;
selecting one or more of the plurality of surfaces as the one or more surface features; and
describing the one or more surface features based on a generic descriptor that can describe both planar and non-planar surface features; and
using the one or more surface features to calculate one of a relative angle and orientation between the set of range data and at least one other set of range data, a rotation and translation of an object in the set of range data with respect to the object in at least one other set of range data, a rotation and translation between the set of range data with and at least one other set of range data, or a navigation solution based on the set of range data and at least one other set of range data.

2. The method of claim 1, wherein segmenting the set of range data includes edge-based segmentation.

3. The method of claim 1, comprising:
extracting one or more edge features based on an intersection of two or more of the plurality of surfaces.

4. The method of claim 1, comprising:
extracting one or more point features based on an intersection of three or more of the plurality of surfaces.

5. The method of claim 1, comprising:
extracting one or more point features, wherein extracting one or more point features includes defining one or more one or more points having a sum of residuals that is 1.5 times standard deviations larger than that of surrounding points as a point feature.

6. The method of claim 1, wherein describing includes describing the one or more surface features using differential geometric properties of the surface feature.

7. The method of claim 1, wherein describing includes describing the one or more surface features based on one of a probabilistic distance measure between the surface feature and a neighborhood of the surface feature or a distance among several features.

8. The method of claim 7, wherein the probabilistic distance measure corresponds to one of: a Kullback-Liebler divergence, a Jensen-Shanon divergence, a Bhattacharyya distance, a Hellinger distance, or a cross-correlation.

9. The method of claim 1, wherein describing includes describing the one or more surface features using statistical properties of points forming the surface feature.

10. The method of claim 1, wherein segmenting the set of range data includes:
adding together residuals for the plurality of points, including adding together the residuals of fitting a plane to a neighborhood of points surrounding the point;
classifying the plurality of points into a first set of points having a sum of residuals above a threshold and a second set of points having a sum of residuals below the threshold; and
classifying the second set of points into the one or more surfaces based on one or more edges in the first set of points.

11. The method of claim 1, comprising:
identifying one or more areas of the set of range data based on laser return strength or number of laser returns below a threshold and excluding points corresponding to the one or more areas from the plurality of points;
organizing the plurality of points into a table according to elevation and azimuth for each point;
interpolating values for one or more points within the table that have a missing or significantly biased value; and
filtering the plurality of points to suppress noise and remove outliers.

12. A device to provide navigation information, the device comprising:
one or more navigation sensors including at least one range finder;
one or more processing devices coupled to the one or more navigation sensors;
one or more memory devices coupled to the one or more processing devices, the one or more memory devices including instructions which, when executed by the one or more processing devices cause the one or more processing devices to:
receive a first and a second set of range data from the at least one range finder;
segment the first set of range data into a first one or more surfaces based on one or more edges in the first set of range data;
segment the second set of range data into a second one or more surfaces based one or more edges in the second set of range data;
extract a first one or more surface features based on the first one or more surfaces, wherein extract a first one or more surface features includes both planar and non-planar surface features if present;
extract a second one or more surface features based on the second one or more surfaces, wherein extract a second one or more surface features includes both planar and non-planar surface features if present;
identify a plurality of features from the first set of range data that match features from the second set of range data; and
calculate a navigation solution based on the features from the first set of range data that match features from the second set of range data.

13. The device of claim 12, wherein extract a first one or more surface features includes:
describe the one or more surface features in an object specific manner using a geometric descriptor; and
wherein extract a second one or more surface features includes:
describe the one or more surface features in an object specific manner using a geometric descriptor.

14. The device of claim 12, wherein identify a plurality of features from the first set of range data that match features from the second set of range data includes define two features as matching if a given distance measure between descriptors computed by an information measure or a norm of the two features is below a distance threshold and the distance is the smallest distance as compared to potential matches with other features.

15. The device of claim 12, wherein identify a plurality of features from the first set of range data that match features from the second set of range data includes define two surface features as matching if one of the correlation or mutual information between the two surface features is above a threshold and is the largest as compared to potential matches with other features.

16. The device of claim 12, wherein calculate a navigation solution includes determining a navigation solution using one of simultaneous localization and mapping (SLAM) and a robust motion estimation algorithm.

17. The device of claim 12, wherein the at least one range finder includes a light detection and ranging device (LIDAR).

18. The device of claim 12, wherein segment the first set of range data into a first one or more surfaces based on one or more edges in the first set of range data includes:
calculate a sum of squared residuals for the first set of range data, wherein calculate a sum of residuals for a point includes sum the residuals of fitting a plane to a neighborhood of points surrounding the point;
classify the first set of range data into first edge points having a sum of squared residuals above a threshold and first surface points having a sum of squared residuals below the threshold; and
classify the first surface points into a first one or more surfaces based on one or more edges in the first edge points; and
wherein segment the second set of range data into a second one or more surfaces based one or more edges in the second set of range data includes:
calculate a sum of squared residuals for the second set of range data;
classify the second set of range data into second edge points having a sum of squared residuals above the threshold and first surface points having a sum of squared residuals below the threshold; and
classify the second surface points into a second one or more surfaces based on one or more edges in the second edge points.

19. A processor-readable medium including instructions which, when executed by a processor, cause the processor to:
receive a first and a second set of range data from the at least one range finder;
segment the first and second sets of range data into a first and second one or more surfaces based on one or more edges in the first and second sets of range data;
extract one or more surface features based on the first and second one or more surfaces, wherein extract one or more surface features includes describe a surface feature using one of geometric or statistical quantities;
identify a plurality of features from the first set of range data that match features from the second set of range data; and
calculate a navigation solution based on the features from the first set of range data that match features from the second set of range data.

20. The processor-readable medium of claim 19, including instructions which cause the processor to:
    extract one or more point features and extract one or more edge features based on intersections of the first and second one or more surfaces.

* * * * *